UNITED STATES PATENT OFFICE 2,517,964

PEROXY DICARBONATES

William E. Bissinger, Akron, Ohio, assignor to Pittsburgh Plate Glass Company, Allegheny County, Pa., a corporation of Pennsylvania No Drawing. Application September 10, 1946,
Serial No. 696,039

5 Claims. (Cl. 260—453)

This invention relates to a novel group of compounds and methods of preparing such compounds and to novel methods of polymerization involving use of such compounds as catalysts.

In accordance with the present invention a novel class of compounds which are esters of nitroaliphatic alcohols and the theoretical peroxy dicarbonic acid and which has the formula

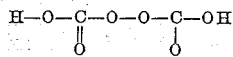

has been provided. These compounds, unlike many peroxy dicarbonates, are stable at room temperature but yield oxygen upon heating. They may be used effectively as polymerization catalysts to promote polymerization of polymerizable unsaturated compounds which polymerize by peroxide catalysts. The new peroxy dicarbonates are more stable than the corresponding compounds prepared from the corresponding alcohols having no nitro groups.

The new group of compounds are understood to have the structure

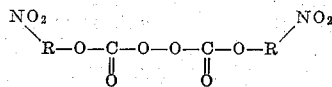

where R is the divalent hydro-carbon aliphatic radical containing at least two carbon atoms of the nitroaliphatic alcohol

the hydroxyl and the nitrogroups being attached to different carbon atoms, preferably to adjacent carbon atoms in an aliphatic chain. These compounds are usually white solids or high boiling liquids at room temperature. They are soluble in or miscible with usual organic solvents such as acetone, chloroform, benzene, toluene, xylene, ethyl alcohol, etc.

The above new peroxy dicarbonates may be prepared from the corresponding haloformates of the nitro alcohols. These novel haloformates are prepared by reaction of phosgene with the nitroalcohol preferably at a temperature somewhat below room temperature, usually 0 to 15° C. The haloformates thus obtained, particularly those formed from liquid alcohols are usually liquids which are soluble in usual organic solvents such as acetone, benzene, xylene, toluene, chloroform, ethanol, methanol, etc. They decompose on heating and react with alkalies to form the corresponding carbonates.

The herein contemplated peroxy dicarbonates may be prepared by reaction of the chloroformates of the nitro alcohols with hydrogen peroxide or an alkali metal peroxide such as sodium peroxide. This reaction may be effected simply by mixing a solution or slurry of the peroxide with the haloformate at a relatively low temperature preferably below room temperature and usually at about 0 to 15° C. Since the reaction is exothermic, cooling generally is required to prevent an undesirable temperature rise during the process.

A preferred method of reacting the nitro alkyl chloroformate with a peroxide involves the preliminary preparation of a slurry of sodium peroxide by reacting aqueous hydrogen peroxide with a solution of caustic soda. When this reaction is conducted in the presence of a stirring device a very finely precipitated sodium peroxide is formed which is subsequently added gradually to the nitro alkyl chloroformate with cooling and agitation. The nitro alkyl peroxy dicarbonate is then separated by filtration or by other suitable means.

The peroxy dicarbonates herein disclosed may be used as bleaching agents or for other purposes as a convenient source of active oxygen. They are useful as catalysts for the polymerization of unsaturated polymerizable compounds which contain one or more of the polymerizable groups $CH_2=C=$, $-C\equiv C-$, $CH\equiv C-$,

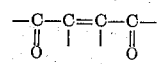

etc. Such compounds include methyl methacrylate, methyl acrylate, styrene, maleic or fumaric esters of ethylene glycol or polyethylene glycol, vinyl acetate, allyl or other unsaturated alcohol esters such as listed in U. S. Patent 2,403,112, etc. The temperatures of polymerization required will vary with the quantity of peroxide used and with the length of the curing period. For example, satisfactory hard castings may be obtained by heating methyl methacrylate with 0.1 percent of the peroxide for 48 hours at 45° C. to produce castings having substantially less color after exposure to accelerated weathering conditions than the same composition when polymerized with an equal amount of benzoyl peroxide.

Generally, casting, impregnating, and surface coating methods may be practiced with the new nitroalkyl peroxy dicarbonates in the same manner that those skilled in the art use benzoyl peroxide. Further details of the preparation and use of the new compounds are set forth in the following examples:

*Example I*

A mixture of one part of 2-nitro-2-methylpropyl chloroformate was prepared by refluxing a dioxane solution containing 1.5 mols of liquid phosgene and 0.7 mol of the nitro alcohol at a temperature of 5 to 10° C. for several hours in a system provided with a reflux condenser capable of condensing phosgene and of permitting escape of evolved HCl from the part of the condenser system. The product was then degassed by bubbling air therethru until dissolved phosgene was removed and the resulting chloroformate was washed with water, dried over calcium chloride and topped at 18 mm. pressure. This chloroformate is a pale straw colored liquid which is stable to water at 30° C. having an index of refraction $n_D^{20}$ 1.4448. It is a powerful lachrymator and is soluble in organic solvents such as acetone, ethyl alcohol.

9.1 grams of the resulting 2-nitro-2 methylpropyl chloroformate was placed in a flask equipped with an agitator and was stirred at a temperature of minus 9° C. During the stirring, a solution which had been formed by mixing 3.3 grams of 28 percent by weight hydrogen peroxide, 4.4 grams of 50 percent by weight NaOH in 30 milliliters of water, was added to the chloroformate while the temperature of the mixture was maintained at 2 to 7° C. A bluish colored solid was formed. After stirring for one hour the mixture was filtered and the solid dissolved in absolute ethyl alcohol and recrystallized by addition of water to the alcohol solution. This solid which is the peroxy dicarbonate of the corresponding nitro alcohol having the structure

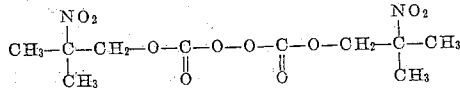

melts at 98.5–99.5° C. with decomposition and is soluble in organic solvents such as acetone, ethyl alcohol and xylene. It was stable at 30° for over 20 days.

Inhibitor-free methyl methacrylate containing 0.1 percent by weight of this peroxy dicarbonate polymerized to a hard polymer when heated at 45° C. for 72 hours.

*Example II*

A mixture containing liquid phosgene and 2-nitrobutyl alcohol, the phosgene being about 10% in excess of the theoretical, was refluxed at a temperature of 5 to 10° C. while permitting escape of evolved HCl. The mixture was degassed after refluxing until the reaction was substantially complete. The resulting 2-nitrobutyl chloroformate was washed with water and dried over calcium chloride. This product is a greenish colored liquid which is stable to water at 30° C.

36.3 grams of 2-nitrobutyl chloroformate was added dropwise to a mixture of 17.6 grams of 50% NaOH, 13.5 grams of 28% hydrogen peroxide and sufficient water to make a total volume of 60 milliliters while maintaining the temperature of the mixture at 2 to 4° C. The mixture became thick. After 20 minutes of stirring, the mixture was extracted with ether and the ether extract evaporated to remove the ether. The resulting product is 2-nitrobutyl peroxy dicarbonate which has the structure

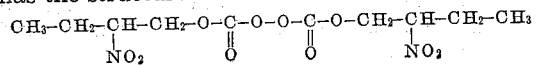

This product melted at 48 to 49.5° C. and decomposed at 94° C. with evolution of gas.

This product effectively catalyzes polymerization of methyl methacrylate when used in the concentration and at the temperature set forth in Example I.

The above process may be used for the production of the solid peroxy dicarbonate of 2-nitro-2-methyl-1-phenyl-1-propanol by use of this alcohol in lieu of -2-nitrobutyl alcohol. This product has properties similar to those of the above.

Peroxy dicarbonates of various other nitroalcohols including 2-nitroethanol, 1-nitro-3-pentene-2-ol, 5-nitro-2-heptene-4-ol, 2-nitro propanol, 2-nitro 3 methyl butanol, nitropentanols such as 2-nitro-n-pentanol, 3 nitropentanol, or other monohydroxy nitro alcohols preferably containing the structure

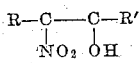

where R and R' are aliphatic hydrocarbon radicals linked to the indicated carbon atoms through carbon. These peroxydicarbonates are generally solids and liberate oxygen on heating.

In the formulae above indicated the nitro groups are indicated generally as being linked to a carbon atom without attempt to indicate the atomic relationship of the atoms of the monovalent nitro group. Modern theory tends to support the viewpoint that nitro compounds have the structure

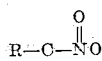

at least one of the oxygen atoms being linked to the nitrogen atom by a coordinate linkage or bond. However, applicant does not desire to be bound by any theory respecting the exact structure of the nitro radical.

Although the present invention has been described with reference to the specific details of certain embodiments thereof, it is not intended that such details shall be regarded as limitations upon the scope of the invention except insofar as included in the accompanying claims.

I claim:

1. Bis(-2 nitro-n-butyl) peroxydicarbonate $$CH_3-CH_2-CH-CH_2-O-C-O-O-C-O-CH_2-CH-CH_2-CH_3$$
$$\phantom{CH_3-CH_2-}NO_2\phantom{-CH_2-}O\phantom{-O-}O\phantom{-O-CH_2-}NO_2$$

2. Bis(2-nitro-2-methyl-n-propyl) peroxydicarbonate $$\begin{array}{cccc}NO_2 & & & NO_2\\CH_3-C-CH_2-O-C-O-O-C-O-CH_2-C-CH_3\\CH_3 & O & O & CH_3\end{array}$$

3. A method of preparing a peroxy dicarbonate of a nitro aliphatic monohydric alcohol having the formula

which comprises reacting a chloroformate of the nitro aliphatic alcohol with a peroxide of the group consisting of hydrogen peroxide and alkali metal peroxides.

4. The process of claim 3 wherein the peroxide is sodium peroxide.

5. A diester of a nitroaliphatic monohydric alcohol having the formula

wherein R is a hydrocarbon radical, and the peroxydicarbonic acid
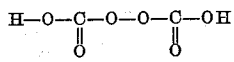
WILLIAM E. BISSINGER.
REFERENCES CITED
The following references are of record in the file of this patent:
UNITED STATES PATENTS
| Number | Name | Date |
|---|---|---|
| 2,361,055 | Pollack | Oct. 24, 1944 |
| 2,370,588 | Strain | Feb. 27, 1945 |
| 2,374,789 | Strain | May 1, 1945 |
| 2,397,630 | Strain | Apr. 2, 1946 |
| 2,415,971 | Stevens | Feb. 18, 1947 |